(12) United States Patent
Lin

(10) Patent No.: US 8,752,476 B2
(45) Date of Patent: Jun. 17, 2014

(54) COFFEE MAKER ENABLING AUTOMATED DRIP BREWING

(75) Inventor: Chih-Te Lin, Taoyuan County (TW)

(73) Assignee: Dong Sheng International Technology Company Limited, Taoyuan, Taoyuan County (TW)

( * ) Notice: Subject to any disclaimer, the term of this patent is extended or adjusted under 35 U.S.C. 154(b) by 225 days.

(21) Appl. No.: 13/299,352

(22) Filed: Nov. 17, 2011

(65) Prior Publication Data

US 2013/0125759 A1    May 23, 2013

(51) Int. Cl.
*A47J 31/44* (2006.01)
*A47J 31/06* (2006.01)
*A47J 31/057* (2006.01)
*A47J 31/46* (2006.01)

(52) U.S. Cl.
CPC ..................... *A47J 31/44* (2013.01)
USPC ..................... 99/281; 99/298; 99/300; 99/304

(58) Field of Classification Search
USPC ........... 99/281–284, 294, 298, 299, 300, 301, 99/302 R, 304–306, 307, 312, 314, 315, 99/323, 405; 239/222, 222.11, 222.17, 239/222.19, 231, 381, 382, 499; 475/9, 475/227, 230, 248, 268, 273, 274, 336; 476/34; 74/20, 22 R, 23, 25, 27, 28, 38, 74/52, 63, 70, 86, 424.5, 490.08, 490.13, 74/813 R
See application file for complete search history.

(56) References Cited

U.S. PATENT DOCUMENTS

| 5,207,148 A * | 5/1993 | Anderson et al. ................ 99/281 |
| 7,237,449 B2 * | 7/2007 | Kato ................................ 74/425 |
| 2006/0065126 A1 * | 3/2006 | Turi ................................ 99/279 |

FOREIGN PATENT DOCUMENTS

| DE | 4122547 A1 * | 1/1993 |
| WO | WO 2010081762 A1 * | 7/2010 |
| WO | WO 2010124962 A2 * | 11/2010 |

* cited by examiner

Primary Examiner — Tu B Hoang
Assistant Examiner — Brandon Harvey
(74) *Attorney, Agent, or Firm* — Rabin & Berdo, P.C.

(57) ABSTRACT

A coffee maker includes a water storage device having a water tank and a water outlet piping communicating with the water tank; a driving device having a driving motor and a driving shaft; and a swing device having a rotating mechanism mounted on the driving shaft and a shifting mechanism connected to the water outlet piping and moving along with the rotating mechanism when the latter rotates. The water outlet piping is brought by a horizontal rotational movement of the rotating mechanism and a linear movement of the shifting mechanism to swing and shift in a spiral rotational course from a center point to outer and inner areas of a filter in a reciprocating motion while pouring water at controlled volume and stability, enabling ground coffee beans on the filter to be quickly and evenly extracted by water to release aromatic smell and sweet flavor just like drip brewing manually.

17 Claims, 8 Drawing Sheets

US 8,752,476 B2

COFFEE MAKER ENABLING AUTOMATED DRIP BREWING

FIELD OF THE INVENTION

The present invention relates to a coffee maker enabling automated coffee brewing, and more particularly to a coffee maker that includes a swing device to achieve the same effect as the manual drip brewing, so that ground coffee beans brewed with hot water can be quickly and evenly extracted to fully release its aromatic smell and sweet flavor.

BACKGROUND OF THE INVENTION

Coffee makers can be generally divided into three types according to the way they used to brew coffee, namely, a siphon coffee maker, an Espresso coffee maker, and a drip coffee maker. The siphon coffee maker is also referred to as a vacuum coffee maker and basically includes two ball-like glass chambers with one fitted to a top of the other one, and the two glass chambers are separated from each other by a strainer having a filtering cloth fixed thereto. To brew coffee, first fill the lower glass chamber with boiled hot water, and then fix the upper glass chamber and the strainer to the top of the lower glass chamber. Thereafter, pour ground coffee beans into the upper glass chamber, and heat the water in the lower glass chamber using an alcohol lamp or other heat source. When the water is boiled, vapor pressure is produced in the lower glass chamber to force the water through a narrow tube into the upper glass chamber to contact with the ground coffee beans. Through stirring, the hot water mixes with the ground coffee beans to absorb the aroma and four flavors of coffee. After the ground coffee beans are sufficiently brewed with water, the heat source is removed. When the air in the lower glass chamber is cooled, the resulting vacuum will draw the brewed coffee through the paper filter back into the lower chamber. At this point, the brewed coffee with aromatic smell and good flavors can be poured into a preheated cup for drinking.

In Espresso brewing, finely ground coffee beans with uniform size are compacted with a compacting tool, so that the ground coffee beans in the filter must be in the form of a compacted cake of coffee to resist the very hot water forced under high pressure through the finely ground, compacted coffee. When the cake of coffee has uniform compactness, all granules of the ground coffee beans are evenly and completely extracted by the hot water to make a cup of concentrated and aromatic Italian Espresso coffee. A balanced symmetry between the water pressure and the resistance of the compacted cake of coffee to the water pressure forms an important and prerequisite factor to brew a cup of high quality Espresso coffee. Since the Espresso brewing means the use of an adequate pressure to force hot water quickly through the ground, compacted coffee beans, only 25 to 30 seconds are needed to extract a cup of coffee to largely save the time and cost of brewing coffee.

In drip brewing, as suggested by its name, a strainer is fixed to a top of a vessel, and a paper filter is put over the strainer. Ground coffee beans are poured on the paper filter and hot water is poured into the strainer, so that the hot water seeps through the ground coffee beans and passes through the fine holes at the bottom of the strainer to drip into the vessel to make a cup of fresh and aromatic coffee. The drip brewing is characterized in that the hot water is sufficiently mixed with the ground coffee beans to extract the aroma and special four flavors of coffee. The extracted liquid of coffee passes through the paper filter and drips into the vessel. Brewing with a paper filter produces clear, light-bodied coffee, which is free of fats, proteins and undesired impurities, allowing people to enjoy delicious coffee without endangering their health.

One of the most important skills for the drip brewing lies in good control of the volume and stability of water poured into the ground coffee beans. By stably pouring adequate volume of hot water in a spiral rotational course from a central point to outer and inner areas of the paper filter in a reciprocating motion, the ground coffee beans can be evenly extracted and all the aroma and flavors of the ground coffee beans can be fully released into the hot water. However, the drip brewing process is usually manually performed, and the experience of the coffee brewing person forms a major factor in brewing a good cup of drip brewed coffee. A person lacking sufficient experience in drip brewing often fails to evenly and reciprocatingly pour the hot water on the ground coffee beans in the spiral rotational course, and as a result, the extracted liquid of coffee dripped into the vessel or the cup is not smooth to adversely affect the overall flavor or taste of coffee. In view that the quality of the manually drip brewed coffee is largely subjected to the experience of the brewing person, it is necessary to develop a coffee maker that enables automated drip brewing in a mass-production manner without being influenced by the experience of an operator.

SUMMARY OF THE INVENTION

A primary object of the present invention is to provide a coffee maker enabling automated drip brewing by providing a swing device in the coffee maker, so that water discharged from the coffee maker is poured on a paper filter in a spiral rotational course from a center point to outer and inner areas of the paper filter in a reciprocating motion and at controlled volume and stability, allowing ground coffee beans on the paper filter to be quickly and evenly extracted by water to release aromatic smell and sweet flavor just like drip brewing manually.

Another object of the present invention is to provide a coffee maker enabling automated drip brewing, so that coffee brewed with the coffee maker is always aromatic and sweet without being affected by a user's experience in brewing coffee, and drip brewing can be effected in a quick and mass-production manner without scarifying the aromatic and sweet flavor of coffee.

To achieve the above and other objects, the coffee maker enabling automated drip brewing according to the present invention includes a water storage device, a driving device, and a swing device located between the water storage device and the driving device. The water storage device has a water tank and a water outlet piping communicating with the water tank. The driving device has a driving motor and an outward projected driving shaft being driven by the driving motor to rotate. The swing device has a rotating mechanism mounted on the driving shaft and a shifting mechanism connected to the water outlet piping and moving along with the rotating mechanism when the latter rotates. The water outlet piping is brought by a horizontal rotational movement of the rotating mechanism and a linear movement of the shifting mechanism to swing and shift in a spiral rotational course to achieve the same effect as drip brewing manually.

In a preferred embodiment, the rotating mechanism includes a rotating assembly connected to the driving shaft, and a turntable connected to the rotating assembly and provided with a linear slide rail extending from a central area toward a peripheral outer area of the turntable; and the shifting mechanism includes a set of holding seats fixedly mounted on the turntable, a screw rod having a first end portion rotatably connected to the set of holding seats and a second end portion outward projected from the set of holding seats, a movable member received in the linear slide rail with an end connected to the screw rod and another opposite end connected to the water outlet piping, a link mounted to the second end portion of the screw rod, and a stationary member being immovable and in contact with the link.

Preferably, the rotating assembly includes a first gear mounted on the driving shaft, a second gear meshing with the first gear, and a tubular member having an end connected to the second gear and another end connected to the turntable; and the tubular member is provided at the end connected to the turntable with a shift slot corresponding to the linear slide rail.

Preferably, the set of holding seats is located at two opposite ends of the linear slide rail on the turntable, and each of the holding seats is in the form of a fixed plate perpendicular to the turntable. The fixed plates are formed at respective center with a through hole, so that the screw rod is rotatably extended through and supported in the two through holes.

Preferably, the stationary member and the link are two meshing gears of a gear set. In a preferred embodiment, the two meshing gears of the gear set are two meshing crown gear and spur gear. In another embodiment, the two meshing gears of the gear set are two meshing first bevel gear and second bevel gear.

According to the preferred embodiment of the present invention, the movable member is internally provided with a bearing for connecting with the water outlet piping, such that the water outlet piping does not rotate along with the rotating mechanism when the latter rotates. Moreover, the water outlet piping includes a fixed pipe coupled with the bearing, and a movable pipe adapted to shift along with the rotating mechanism and the shifting mechanism; and the movable pipe is connected at an end to the water tank of the water storage device and at another opposite end to the fixed pipe.

According to an operable embodiment of the present invention, the water storage device further includes a heating unit for raising a temperature of water stored in the water tank, and a thermostat unit for maintaining the stored water at a temperature best for coffee brewing.

The coffee maker according to the present invention further includes a housing, within which the water storage device, the driving device and the swing device are received. The housing includes a base having a water-catching recess formed at one side of an upper surface thereof; a hollow column being connected at a lower end to another side of the upper surface of the base for receiving the water storage device therein, and being provided on one side facing toward the water-catching recess with an aperture, via which the water outlet piping is outward extended from an interior of the hollow column; and a top being connected to an upper end of the hollow column for receiving the driving device and the swing device therein. The top is provided at a position facing toward and corresponding to the water-catching recess with an opening, via which the swing device is assembled to the water outlet piping.

With the above arrangements, the base, the hollow column and the top of the housing together define between them a brewing space, in which a coffee filter and an extracted-liquid-holding vessel can be conveniently positioned. The water-catching recess has a funnel-like structure fitted therein, and the funnel-like structure has a narrow stem portion being height-adjustably connected to a locating seat formed in the base below the water-catching recess. Further, the top of the housing is provided at one side with a control panel electrically connected to the driving device and the water storage device, allowing a user to set desired water temperature, water discharge volume and swinging rate for the coffee maker at the control panel.

The present invention is advantageously characterized in that the coffee maker includes a swing device capable of providing both rotating and shifting effects, so that the water outlet piping is brought by the rotating mechanism and the shifting mechanism to move in a spiral rotational course from a center point to outer and inner areas of the filter in a reciprocating motion while pouring water to ground coffee beans on the filter. Further, the coffee maker of the present invention is also provided with a heating unit, a thermostat unit and a control panel for controlling the volume and stability of water discharged from the water outlet piping, the swinging rate of the swing device, and the temperature of water for brewing coffee, so that the ground coffee beans can be quickly and evenly extracted by water to release its aromatic smell and sweet flavor. With the coffee maker of the present invention, the brewed coffee is always aromatic and sweet without being affected by a user's experience in drip brewing coffee. Moreover, the present invention also enables drip brewing of coffee in a quick and mass-production manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
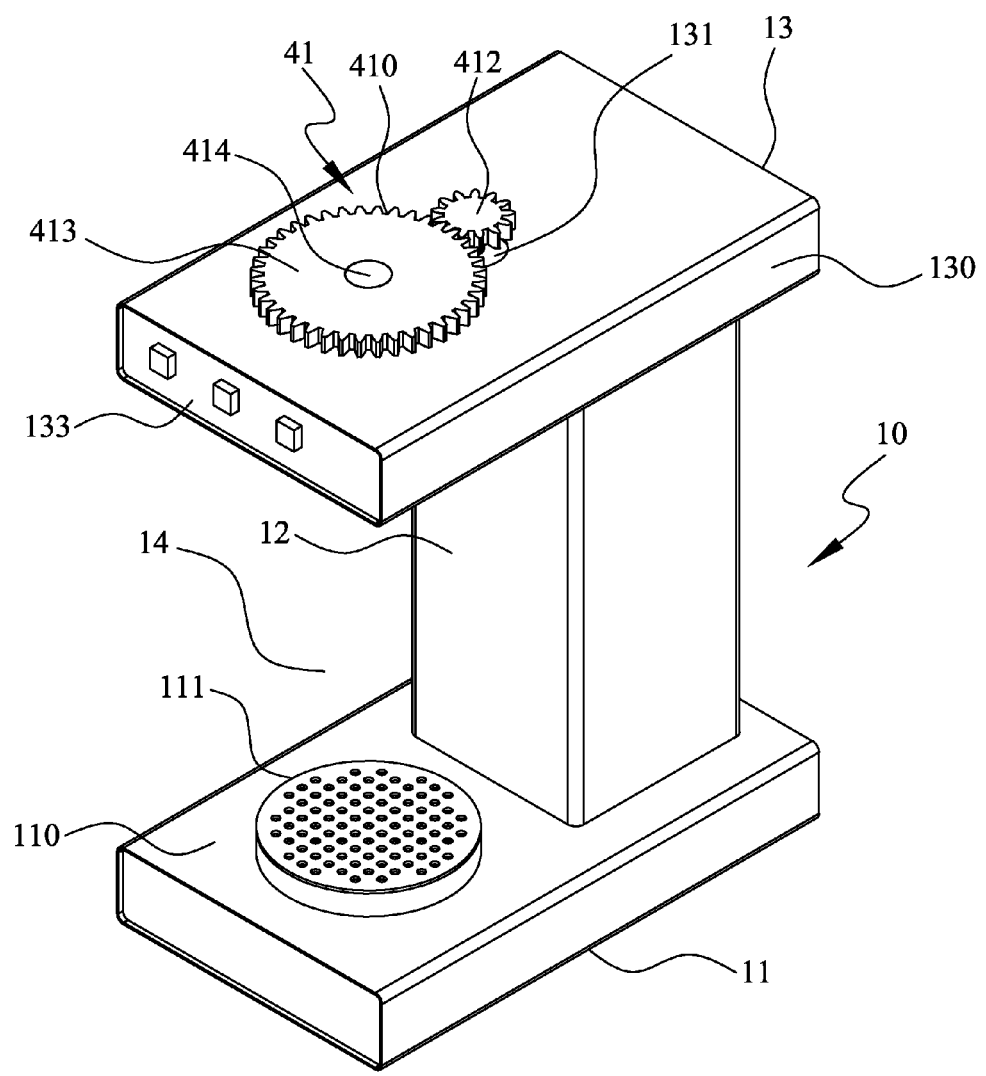
FIG. 1 is an assembled perspective view of a coffee maker according to a preferred embodiment of the present invention.
Figure 2:
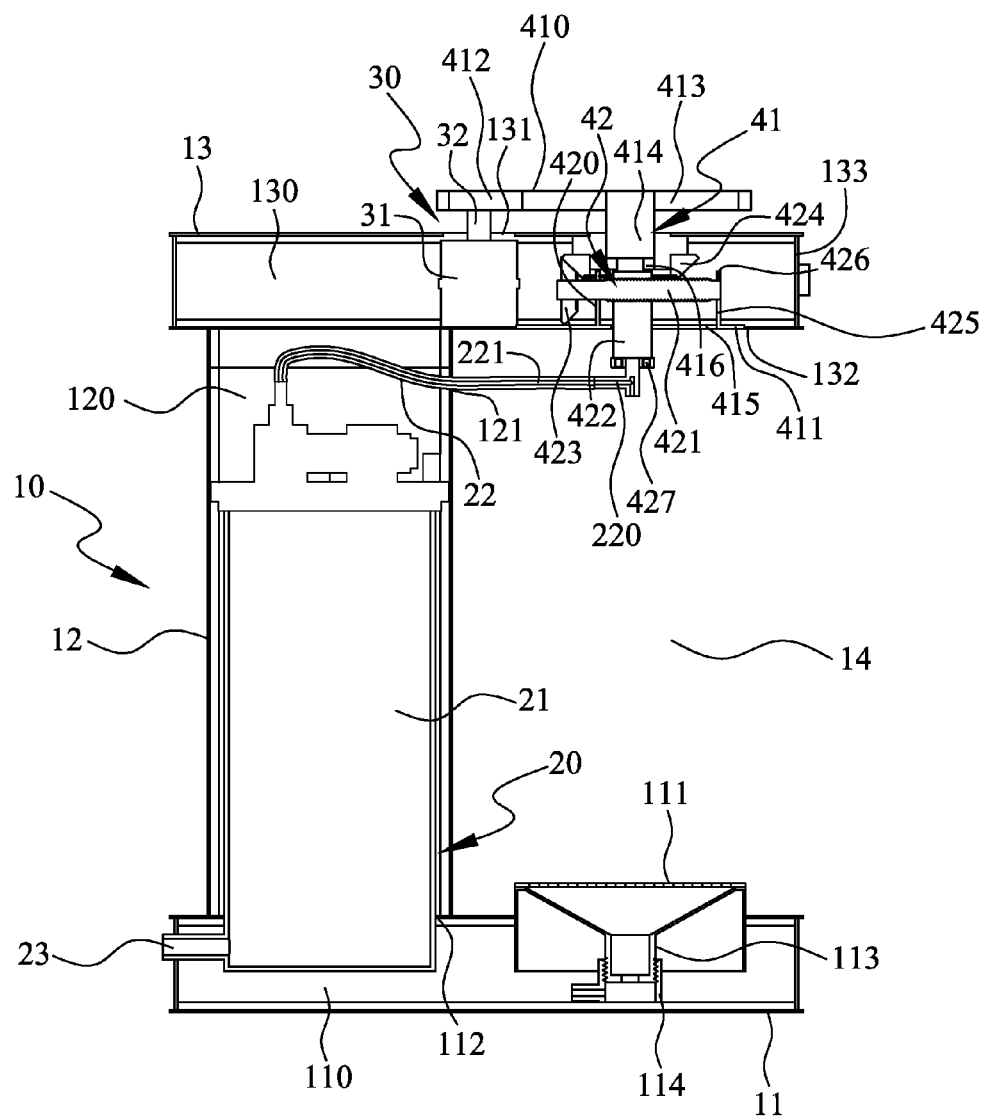
FIG. 2 is a longitudinal sectional view of the coffee maker of FIG. 1.

Please refer to FIGS. 1 and 2. The present invention provides a coffee maker that enables automated drip brewing with a paper filter. For this end, the coffee maker according to a preferred embodiment of the present invention includes a housing 10, a water storage device 20, a driving device 30, and a swing device 40. The water storage device 20, the driving device 30, and the swing device 40 are received in the housing 10, and the swing device 40 is assembled to between the water storage device 20 and the driving device 30.

Figure 3:
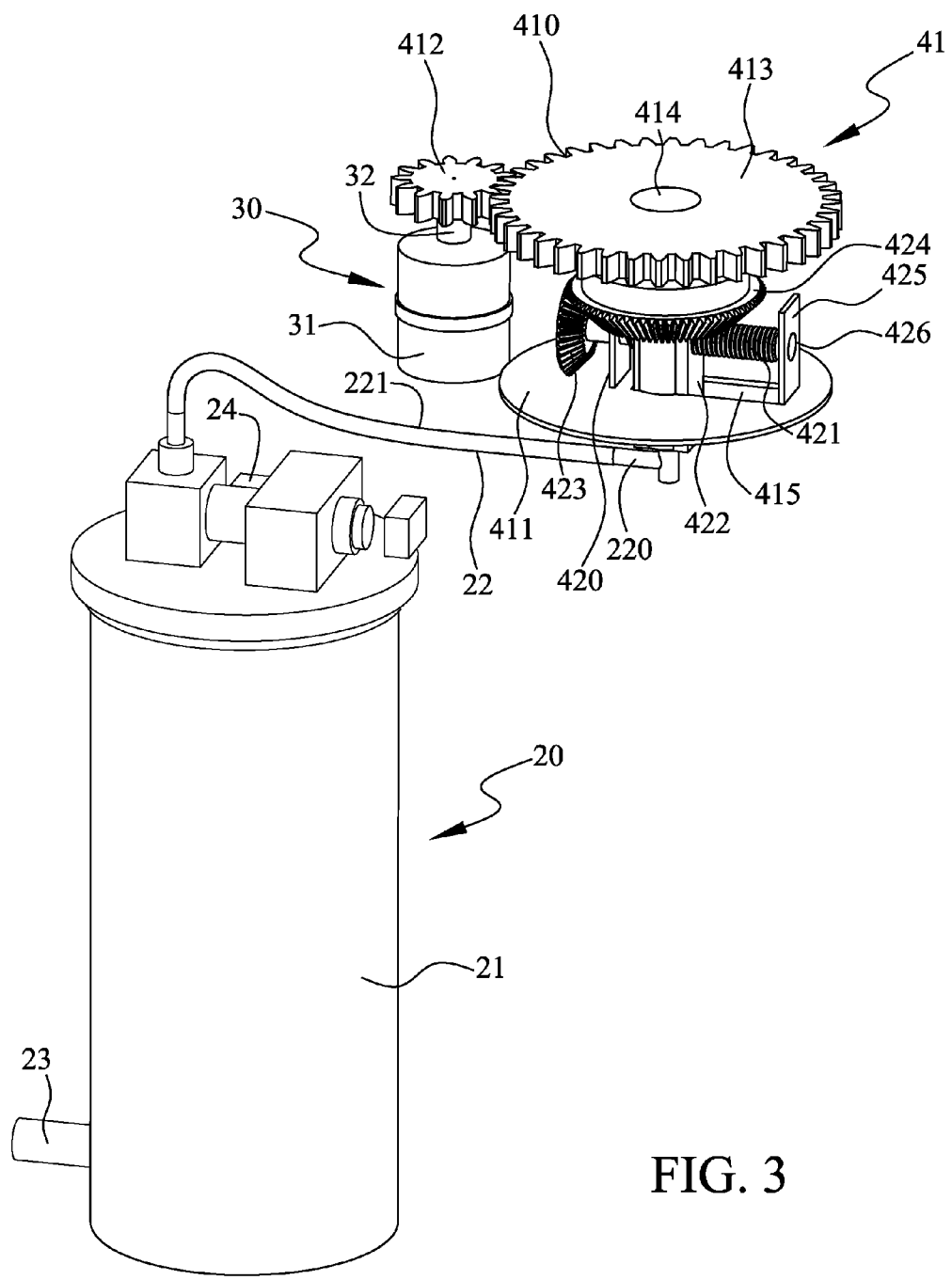
FIG. 3 is a perspective view showing the arrangement and assembling of a water storage device, a driving device, and a swing device for the coffee maker of the present invention.

Please refer to FIGS. 2 and 3. The water storage device 20 includes a water tank 21 for containing an amount of drinking water, a water outlet piping 22 provided on a sidewall surface of the water tank 21 to communicate with the latter, and a water inlet piping 23 provided on a lower side of the water tank 21 to connect with an external water supply. In the illustrated preferred embodiment, the water outlet piping 22 is connected to a top of the water tank 21.

The driving device 30 includes a driving motor 31 serving as a driving source. The driving motor 31 has a driving shaft 32 outward extended from the driving motor 31 for driving the swing device 40 to automatically shift in a manner similar to the movement of drip brewing manually.

The swing device 40 includes a rotating mechanism 41 and a shifting mechanism 42. The rotating mechanism 41 is mounted on the driving shaft 32 of the driving device 30. The shifting mechanism 42 is mounted to the water outlet piping 22 of the water storage device 20 and is connected to the rotating mechanism 41 to move along with the latter.

The coffee maker of the present invention is characterized by that the water outlet piping 22 of the water storage device 20 is brought to swing and shift in a spiral rotational course by a horizontal rotational movement of the rotating mechanism 41 and a linear movement of the shifting mechanism 42 under a rotating state. In this manner, when the coffee maker of the present invention is actuated to supply water, the water outlet piping 22 will be driven to move and achieve the same effect as drip brewing manually.

Figure 4:
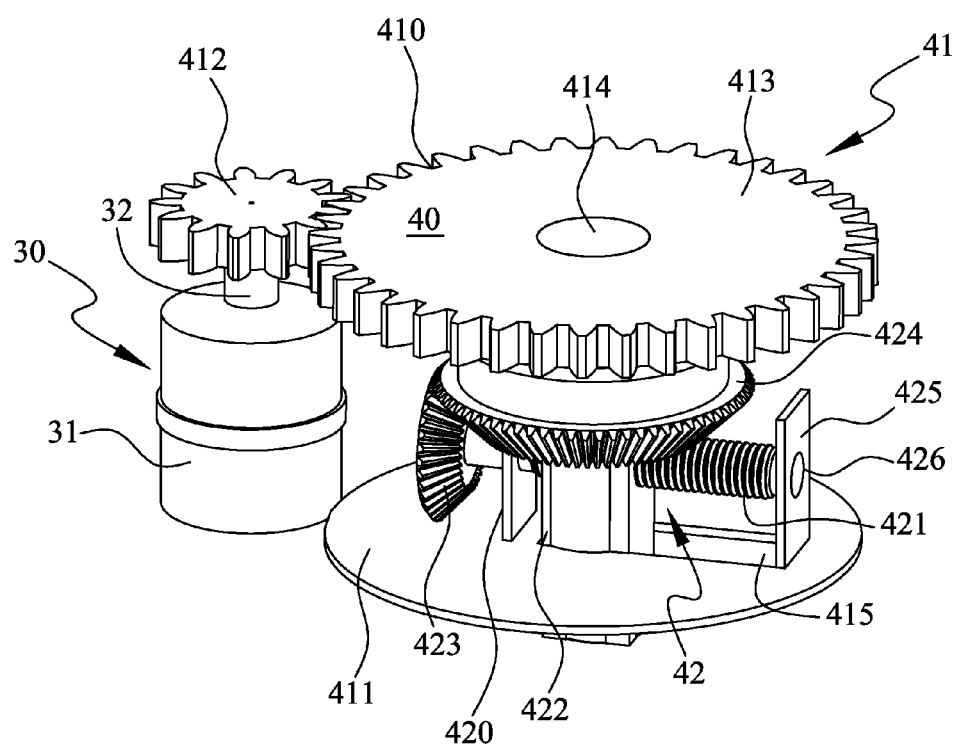
FIG. 4 is an enlarged perspective view of the swing device and the driving device shown in FIG. 3.
Figure 5:
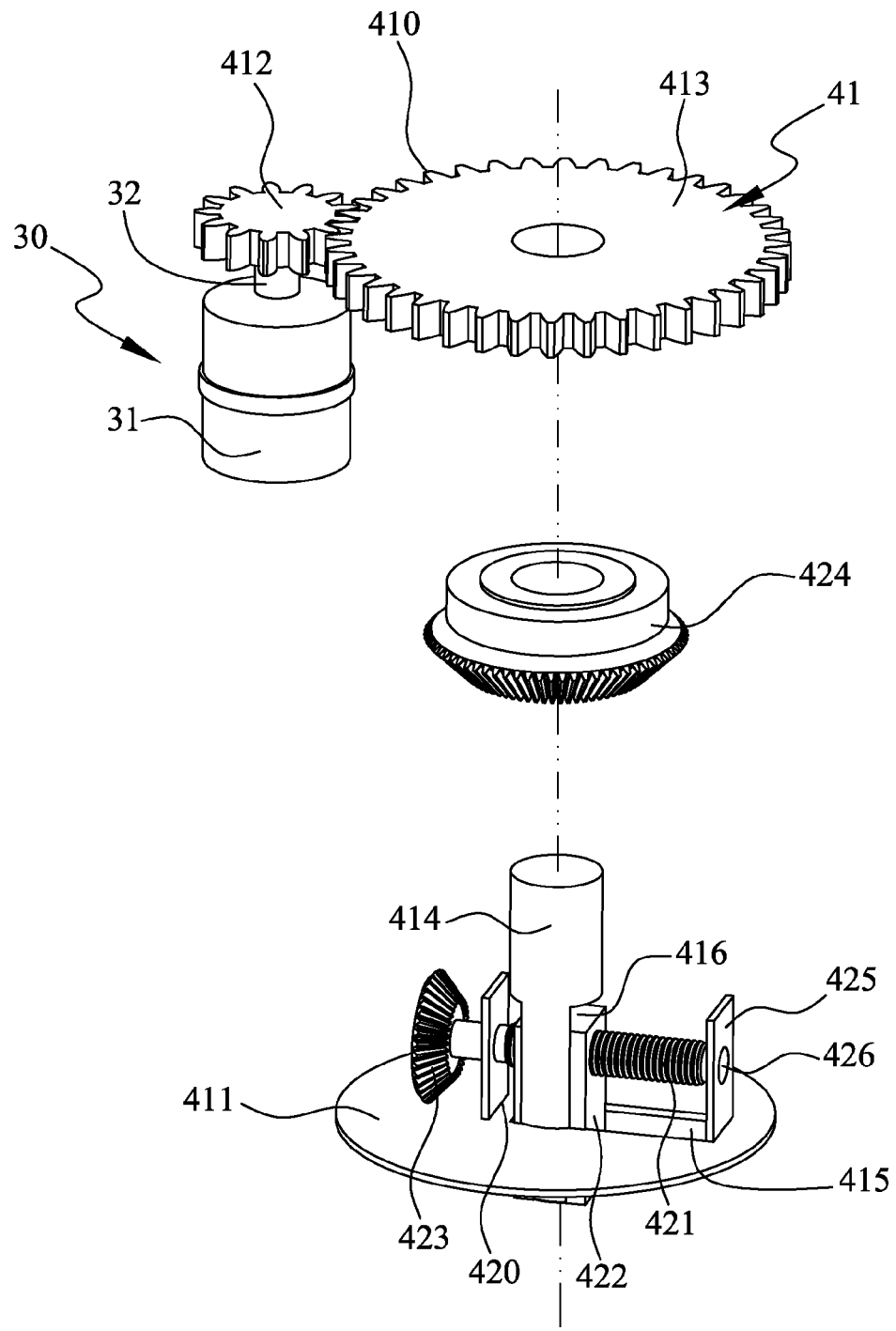
FIG. 5 is an exploded perspective view of a rotating mechanism of the swing device shown in FIG. 4.

Please refer to FIGS. 4 and 5. The rotating mechanism 41 includes a rotating assembly 410 and a turntable 411. The rotating assembly 410 includes a first gear 412 mounted to the driving shaft 32, a second gear 413 meshing with the first gear 412, and a tubular member 414 having an end connected to the second gear 413 and another opposite end connected to the turntable 411. The turntable 411 is provided with a linear slide rail 415, and the tubular member 414 is provided at the end connected to the turntable 411 with a shift slot 416 corresponding to the linear slide rail 415.

Figure 6:
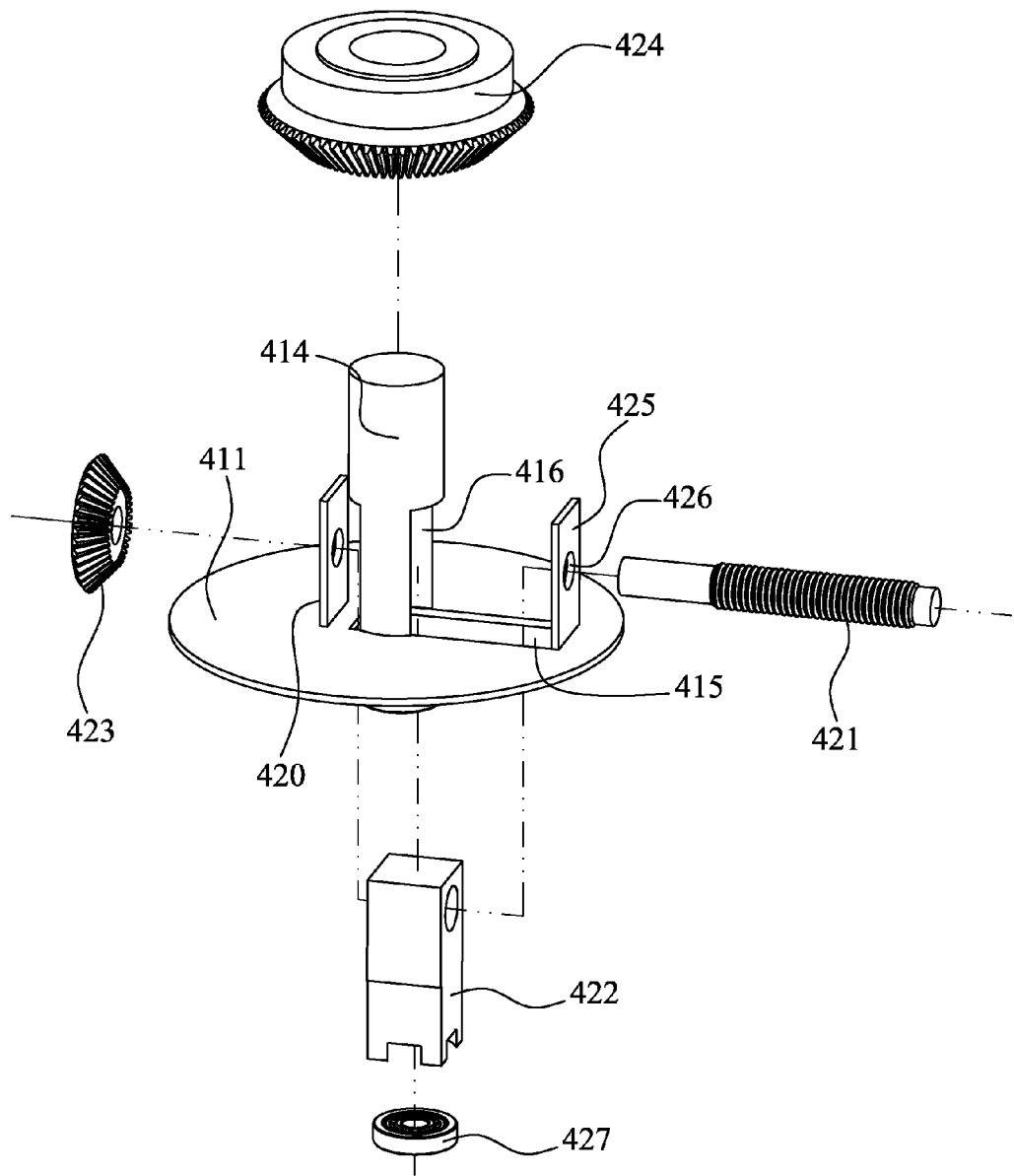
FIG. 6 is an exploded perspective exploded view of a shifting mechanism of the swing device shown in FIG. 4.

As shown in FIG. 6, the shifting mechanism 42 includes a set of holding seats 420, a screw rod 421, a movable member 422, a link 423, and a stationary member 424. The set of holding seats 420 is located at two opposite ends of the linear slide rail 415 of the turntable 411, and each of the holding seats 420 is in the form of a fixed plate 425 perpendicular to the turntable 411. The fixed plates 425 are formed at respective center with a through hole 426, so that the screw rod 421 is rotatably extended through and supported in the two through holes 426. The screw rod 421 has a first end portion rotatably held to the set of holding seats 420, and a second end portion outward projected from the set of holding seats 420. The movable member 422 is received in the linear slide rail 415 with an end extended through by and accordingly connected to the screw rod 421 and another opposite end connected to the water outlet piping 22. The link 423 is mounted to the second end portion of the screw rod 421. The stationary member 424 is immovable and in contact with the link 423.

As shown, in the present invention, the stationary member 424 and the link 423 are two meshing gears of a gear set. In the illustrated preferred embodiment, the gear set includes a crown gear and a spur gear. In another preferred embodiment, the gear set may include a first bevel gear and a second bevel gear meshing with each other. However, it is understood the above-mentioned different types of gear sets are only for convenient explanation of the present invention and not intended to limit the structures of the stationary member 424 and the link 423 in any way.

The movable member 422 is internally provided with a bearing 427, which is connected with the water outlet piping 22 to prevent the water outlet piping 22 from rotating along with the rotating mechanism 41 when the latter rotates. As can be seen in FIG. 2, the water outlet piping 22 includes a fixed pipe 220 coupled with the bearing 427, and a movable pipe 221 adapted to shift along with the rotating mechanism 41 and the shifting mechanism 42. The movable pipe 221 is connected at an end to the water tank 21 of the water storage device 20 and at another opposite end to the fixed pipe 220.

Please refer to FIG. 3. To enable convenient operation of the coffee maker, the water storage device 20 in an operable embodiment may further include a heating unit 24 for raising a temperature of the water stored in the water tank 21, and a thermostat unit 25 (see FIG. 7) for maintaining the stored water at a temperature best for coffee brewing.

Figure 7:
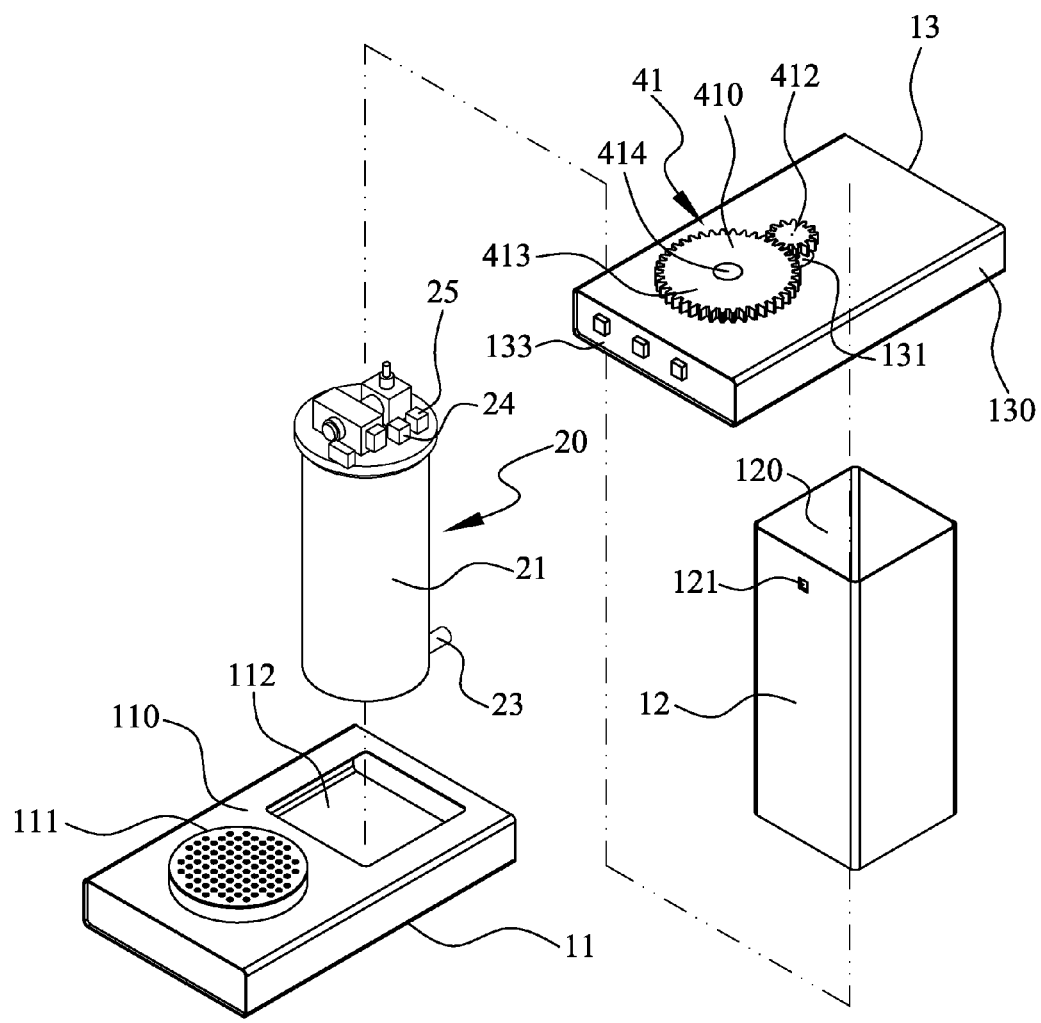
FIG. 7 is an exploded perspective view of a housing for the coffee maker of FIG. 1.

Please refer to FIGS. 2 and 7 at the same time. In the illustrated preferred embodiment, the housing 10 includes a base 11, a hollow column 12 connected at a lower end to the base 11, and a top 13 connected to an upper end of the hollow column 12, such that the base 11, the hollow column 12 and the top 13 together define between them a brewing space 14, in which a coffee filter and an extracted-liquid-holding vessel can be conveniently positioned.

The base 11 is a flat hollow body 110 formed of plates. A water-catching recess 111 is formed on a side of an upper surface of the flat hollow body 110 and an opening 112 is formed on another side of the upper surface of the flat hollow body 110 for the hollow column 12 to engage therewith and connect thereto. A funnel-like structure 113 is fitted in the water-catching recess 111, and a locating seat 114 is externally fitted around a narrow stem of the funnel-like structure 113 for adjusting the latter to different heights relative to the flat hollow body 110. The locating seat 114 is integrally formed in the base 11. In a preferred embodiment, the funnel-like structure 113 and the locating seat 114 are respectively provided with external and internal threads, which correspond to each other, so that the funnel-like structure 113 can be adjusted in height relative to the locating seat 114 by screwing into or loosening from the locating seat 114.

Moreover, the hollow column 12 internally defines a receiving space 120 for receiving the water storage device 20 therein, and is provided on one sidewall facing toward the water-catching recess 111 with an aperture 121, via which the water outlet piping 22 can be outward extended from an interior of the hollow column 12 to connect to the swing device 40. Further, the hollow column 12 is assembled to the base 11 and the top 13 via screws (not shown).

The top 13 is also a flat hollow body 130 formed by plates for receiving the driving device 30 and the swing device 40 therein. The flat hollow body 130 is provided on an upper surface with a plurality of first openings 131, via which the driving device 30 and the swing device 40 can be extended to partially expose to an external environment. The flat hollow body 130 is also provided at a position facing toward and corresponding to the water-catching recess 111 with a second opening 132, via which the swing device 40 is partially projected to assemble to the water outlet piping 22. The top 13 is further provided on a front side with a control panel 133, which is electrically connected to the driving device 30 and the water storage device 20, so that a user may set the coffee maker to a desired temperature for the stored water, a desired water discharging volume, and a desired swinging rate at the control panel 133.

Figure 8:
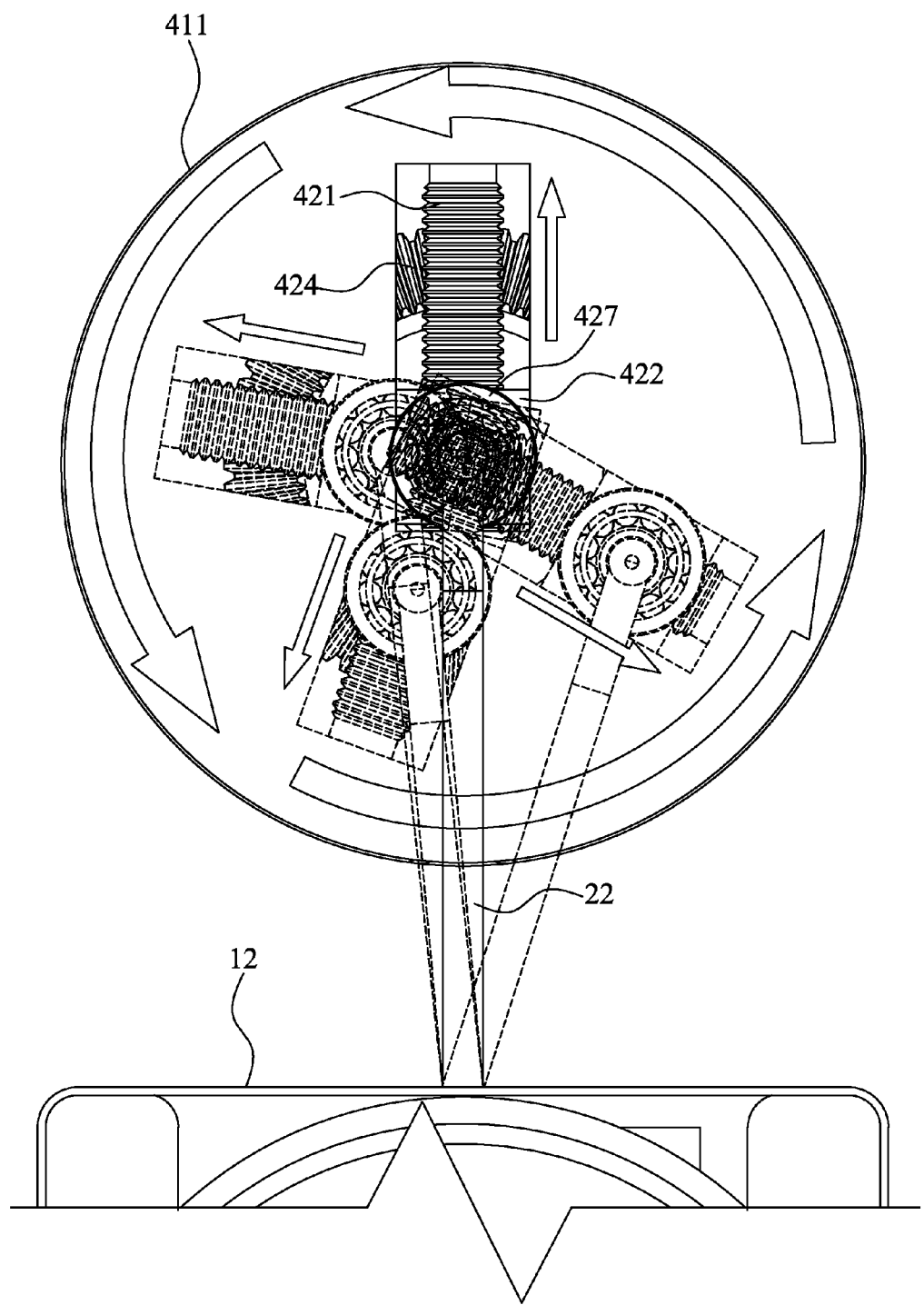
FIG. 8 shows the swing device for the coffee maker of the present invention brings a water outlet piping to move in a spiral rotational course.

Please refer to FIG. 8. When the coffee maker of the present invention is actuated and in a water discharging state, the swing device 40 will operate and drive the water outlet piping 22 to shift, as shown in FIG. 8. More specifically, the rotating mechanism 41 of the swing device 40 brings the whole shifting mechanism 42 to rotate while the shifting mechanism 42 linearly shifts in a horizontal plane along the linear slide rail 415 to gradually move from a central area of the turntable 411 to outer and inner areas of the turntable 411 in a reciprocating motion. This in turn brings the water outlet piping 22 to shift counterclockwise in a spiral rotational course to thereby achieve the same effect as brewing coffee manually.

Of course, it is also possible for the coffee maker of the present invention to have an additional driving device to engage with the shifting mechanism 42 of the swing device 40, so that the rotating mechanism 41 and the shifting mechanism 42 of the coffee maker are respectively driven by an independent driving source. However, it is understood the provision of two independent driving sources for the rotating mechanism 41 and the shifting mechanism 42 is only an exemplary description to facilitate easy explanation of the present invention and not intended to limit the present invention to such technical means in any way.

In summary, the present invention is advantageously characterized in that the coffee maker includes a swing device capable of providing both rotating and shifting effects, so that the water outlet piping is brought by the rotating mechanism and the shifting mechanism to move in a spiral rotational course from a center point to outer and inner areas of the filter in a reciprocating motion while pouring water to the filter. Further, the coffee maker of the present invention is also provided with a heating unit, a thermostat unit and a control panel for controlling the volume of water discharged from the water outlet piping, the stability of the swinging rate of the swing device, and the temperature of water for brewing coffee, so that the ground coffee beans can be quickly and evenly extracted by water to release its aromatic smell and sweet flavor. With the coffee maker of the present invention, the drip brewed coffee is always aromatic and sweet without being affected by a user's experience in drip brewing coffee. Moreover, the present invention also enables drip brewing of coffee in a quick and mass-production manner.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A coffee maker, comprising:
    a water storage device including a water tank and a water outlet piping communicating with the water tank;
    a driving device including a driving motor and a driving shaft outwardly extended from the driving motor; and
    a swing device being mounted between the water outlet piping of the water storage device and the driving shaft of the driving device, the swing device including a rotating mechanism and a shifting mechanism,
        the rotating mechanism being mounted on the driving shaft of the driving device, and
        the shifting mechanism being connected to the water outlet piping of the water storage device, and
        the shifting mechanism being connected to the rotating mechanism to move along with the driving shaft of the driving device,
    wherein the rotating mechanism brings the whole shifting mechanism to rotate while the shifting mechanism linearly shifts in a horizontal plane, and the water outlet piping is brought by the rotating mechanism and the shifting mechanism, while the coffee maker is in a water discharging state, to rotate and shift in a spiral course.

2. The coffee maker as claimed in claim 1, wherein
    the rotating mechanism includes
        a rotating assembly connected to the driving shaft, and
        a turntable connected to the rotating assembly and provided with a linear slide rail extending from a central area of the turntable toward a peripheral outer area of the turntable, and wherein
    the shifting mechanism includes
        a set of holding seats fixedly mounted on the turntable,
        a screw rod having
            a first end portion rotatably connected to the set of holding seats, and
            a second end portion outwardly projected from the set of holding seats,
        a movable member received in the linear slide rail, the movable member having
            an end connected to the screw rod, and
            another opposite end connected to the water outlet piping,
        a link mounted to the second end portion of the screw rod, and
        a stationary member being in contact with the link.

3. The coffee maker as claimed in claim 2, wherein the rotating assembly includes
    a first gear mounted on the driving shaft,
    a second gear meshing with the first gear, and
    a tubular member having
        an end connected to the second gear and
        another opposite end connected to the turntable,
    and the tubular member being provided, at the another opposite end connected to the turntable, with a shift slot corresponding to the linear slide rail.

4. The coffee maker as claimed in claim 2, wherein the set of holding seats is located at two opposite ends of the linear slide rail so as to be on the turntable, and
    each of the holding seats being in a form of a fixed plate perpendicular to the turntable, and the fixed plates being formed, at respective center thereof, with a through hole, so that the screw rod is rotatably extended through and supported in the two through holes.

5. The coffee maker as claimed in claim 2, wherein the stationary member and the link are two meshing gears of a gear set.

6. The coffee maker as claimed in claim 5, wherein the two meshing gears of the gear set are selected from the group consisting of
    a crown gear and a spur gear meshed together, and
    a first bevel gear and a second bevel gear meshed together.

7. The coffee maker as claimed in claim 2, wherein the movable member is internally provided with a bearing for connecting with the water outlet piping, such that the water outlet piping does not rotate along with the rotating mechanism when the rotating mechanism rotates.

8. The coffee maker as claimed in claim 7, wherein the water outlet piping includes
    a fixed pipe coupled with the bearing, and
    a movable pipe adapted to shift along with the rotating mechanism and the shifting mechanism, the movable pipe being connected at an end thereof to the water tank of the water storage device and at another opposite end of the movable pipe to the fixed pipe.

9. The coffee maker as claimed in claim 1, wherein the water storage device further includes a heating unit for raising a temperature of water stored in the water tank, and a thermostat unit for maintaining the stored water at a temperature for coffee brewing.

10. The coffee maker as claimed in claim 1, further comprising a housing, within which the water storage device, the driving device and the swing device are received.

11. The coffee maker as claimed in claim 10, wherein the housing includes
- a base having a water-catching recess formed on one side of an upper surface of the base;
- a hollow column being connected at a lower end thereof to another side of the upper surface of the base for receiving the water storage device therein, and being provided on one side facing toward the water-catching recess, the hollow column having an aperture, via which the water outlet piping is outwardly extended from an interior of the hollow column; and
- a top connected to an upper end of the hollow column for receiving the driving device and the swing device therein, the top being provided at a position facing toward and corresponding to the water-catching recess with an opening, via which the swing device is connected to the water outlet piping.

12. The coffee maker as claimed in claim 11, wherein the base, the hollow column and the top of the housing together define between them a brewing space, in which a coffee filter and an extracted-liquid-holding vessel can be positioned.

13. The coffee maker as claimed in claim 11, wherein the water-catching recess has a funnel-shaped structure fitted therein, and the funnel-shaped structure having a narrow stem portion being height-adjustably connected to a locating seat formed in the base below the water-catching recess.

14. The coffee maker as claimed in claim 11, wherein the top of the housing is provided at one side with a control panel electrically connected to the driving device and the water storage device, allowing a user to set desired water temperature, water discharge volume and swinging rate for the coffee maker at the control panel.

15. The coffee maker as claimed in claim 11, further comprising:
- a locating seat formed in the base below the water-catching recess; and
- a funnel-shaped structure fitted into the water-catching recess, and the funnel-shaped structure has a narrow stem portion being connected to the locating seat so that the funnel-shaped structure is adjustable in height relative to the locating seat.

16. The coffee maker as claimed in claim 1, wherein the rotating mechanism is connected to the water outlet piping only though the shifting mechanism.

17. The coffee maker as claimed in claim 1, wherein the shifting mechanism is connected to the driving device only through the rotating mechanism.

* * * * *